(12) United States Patent
Ware

(10) Patent No.: US 12,493,890 B2
(45) Date of Patent: Dec. 9, 2025

(54) BLOCKCHAIN POWERED ART AUTHENTICATION

(71) Applicant: Outlander Capital LLC, Dallas, TX (US)

(72) Inventor: Les Ware, Dallas, TX (US)

(73) Assignee: OUTLANDER CAPITAL LLC, Dallas, TX (US)

( * ) Notice: Subject to any disclaimer, the term of this patent is extended or adjusted under 35 U.S.C. 154(b) by 219 days.

(21) Appl. No.: 18/138,697

(22) Filed: Apr. 24, 2023

(65) Prior Publication Data

US 2023/0342790 A1 Oct. 26, 2023

Related U.S. Application Data

(60) Provisional application No. 63/334,017, filed on Apr. 22, 2022.

(51) Int. Cl.
| | |
|---|---|
| *G06Q 30/06* | (2023.01) |
| *G06Q 10/06* | (2023.01) |
| *G06Q 10/10* | (2023.01) |
| *G06Q 30/018* | (2023.01) |
| *G06Q 30/02* | (2023.01) |
| *H04L 67/1097* | (2022.01) |

(52) U.S. Cl.
CPC ..... *G06Q 30/0185* (2013.01); *H04L 67/1097* (2013.01)

(58) Field of Classification Search
CPC ........................ G06Q 30/0185; H04L 67/1097
USPC ........................................... 705/1.1–912, 318
See application file for complete search history.

(56) References Cited

U.S. PATENT DOCUMENTS

| | | | | |
|---|---|---|---|---|
| 7,680,306 | B2 * | 3/2010 | Boutant | H04L 9/3247 |
| | | | | 382/141 |
| 9,152,862 | B2 * | 10/2015 | Ross | G06T 7/0008 |
| 9,443,298 | B2 * | 9/2016 | Ross | G06V 30/412 |
| 10,740,732 | B2 * | 8/2020 | Thomas | G06Q 20/405 |
| 10,902,540 | B2 * | 1/2021 | Ross | G06F 18/22 |
| 11,087,013 | B2 * | 8/2021 | Withrow | G06F 21/44 |
| 11,113,554 | B2 | 9/2021 | McConnell et al. | |
| 11,113,754 | B2 | 9/2021 | Andon et al. | |
| 2012/0155593 | A1 | 6/2012 | Crihan | |
| 2016/0203572 | A1 | 7/2016 | McConaghy et al. | |
| 2016/0342982 | A1 | 11/2016 | Thomas et al. | |
| 2017/0032285 | A1 | 2/2017 | Sharma et al. | |

(Continued)

FOREIGN PATENT DOCUMENTS

WO WO-2023183655 A1 * 9/2023

OTHER PUBLICATIONS

International Search Report and Written Opinion for PCT/US 23/19683, mailed on Jul. 18, 2023, 8 pages.

*Primary Examiner* — Jonathan P Ouellette
(74) *Attorney, Agent, or Firm* — Brill Law Office; Jeffrey Brill

(57) ABSTRACT

Scan matching can be used for art authentication. A digital scan of at least a portion of the authentic painting (or other type of artwork) is created. If a scan exists that is trusted to be a digital image identifying the authentic artwork, a subsequent scan can be created of the work a buyer intends to purchase. If the subsequently created scan matches the trusted scan of the artwork, the buyer can conclude that the artwork to be purchased is the authentic one. The trusted scan passes to the buyer as a blockchain transaction.

25 Claims, 7 Drawing Sheets

(56) References Cited

U.S. PATENT DOCUMENTS

2023/0008345 A1* 1/2023 Agrawal .................. G06F 21/44
2023/0094557 A1* 3/2023 Meghji ................... G06F 21/44
　　　　　　　　　　　　　　　　　　　　　　348/135
2023/0177490 A1* 6/2023 Moore ............... G06Q 20/3827
　　　　　　　　　　　　　　　　　　　　　　705/66

* cited by examiner

*FIG. 4*

BLOCKCHAIN POWERED ART AUTHENTICATION

CROSS-REFERENCE TO RELATED APPLICATION

The present application claims the benefit under 35 U.S.C. § 119(e) of U.S. Provisional Patent Application Ser. No. 63/334,017, entitled "Blockchain Powered Art Authentication," filed on Apr. 22, 2022, and having the same assignee, the entire contents of which are incorporated herein by reference.

TECHNICAL FIELD

This disclosure pertains generally to computer generated blockchains, and more specifically to automatically authenticating physical artwork with scans using blockchain security over a data communication network.

BACKGROUND

There is a large and robust market for paintings and other physical artworks (e.g., drawings, etchings, etc.). One concern when purchasing art is authentication of the work. A buyer needs to have confidence that the work the buyer receives is in fact the same work that the buyer agreed to purchase, and not a forgery or unauthorized copy. For example, if a buyer views and purchases an artwork online, at a gallery or at an auction, the buyer needs assurance that the work of which the buyer later takes possession is the same one.

It would be desirable to address these issues.

SUMMARY

The above-mentioned issues are addressed by systems, methods, and non-transitory computer readable-media for automatically authenticating physical artwork with scans using blockchain security over a data communication network.

One tool that can be used for art authentication is scan matching. A digital scan of at least a portion of the authentic painting (or other type of artwork) is created. A scan that is trusted to be a digital image identifying the authentic artwork and scan instructions for recreating the scan are secured on a blockchain. A subsequent scan can be created of the work a buyer intends to purchase and compared against the trusted scan stored on the blockchain. For security reasons the trusted scan and/or scan instructions can be encrypted and/or signed by the artist and/or current owner. If the subsequently created scan matches the trusted scan of the authentic artwork, the buyer can conclude that the artwork to be purchased is the authentic one. In addition to the purchase of the authenticated physical artwork, a blockchain transaction transfers the trusted scan and scan instructions from the seller to the buyer on the blockchain. A smart contract stored on the blockchain with the trusted scan and scan instructions can automatically execute the blockchain-based authentication process, and the subsequent blockchain transaction.

The features and advantages described in this summary and in the following detailed description are not all-inclusive, and particularly, many additional features and advantages may be apparent to one of ordinary skill in the relevant art in view of the drawings, specification, and claims hereof. Moreover, it should be noted that the language used in the specification has been principally selected for readability and instructional purposes, and may not nave been selected to delineate or circumscribe the inventive subject matter, resort to the claims being necessary to determine such inventive subject matter.

BRIEF DESCRIPTION OF THE DRAWINGS

FIG. 4 is a table illustrating a sample scan grid of an artwork surface, according to other implementations.

The Figures depict various implementations for purposes of illustration only. One skilled in the art will readily recognize from the following discussion that other implementations of the structures and methods illustrated herein may be employed without departing from the principles described herein.

DETAILED DESCRIPTION

The disclosure herein provides details of systems, methods, and non-transitory computer readable-media for automatically authenticating physical artwork with scans using blockchain security over a data communication network. The implementations disclosed are limited for conciseness. Those of the ordinary skill in the relevant art will recognize numerous additional implementations given the present disclosure. For example, although artwork is referred to throughout, the techniques can apply to many unique physical items, such as antiques or other physical artifacts.

I. Systems for Blockchain Artwork Authentication

Figure 1:
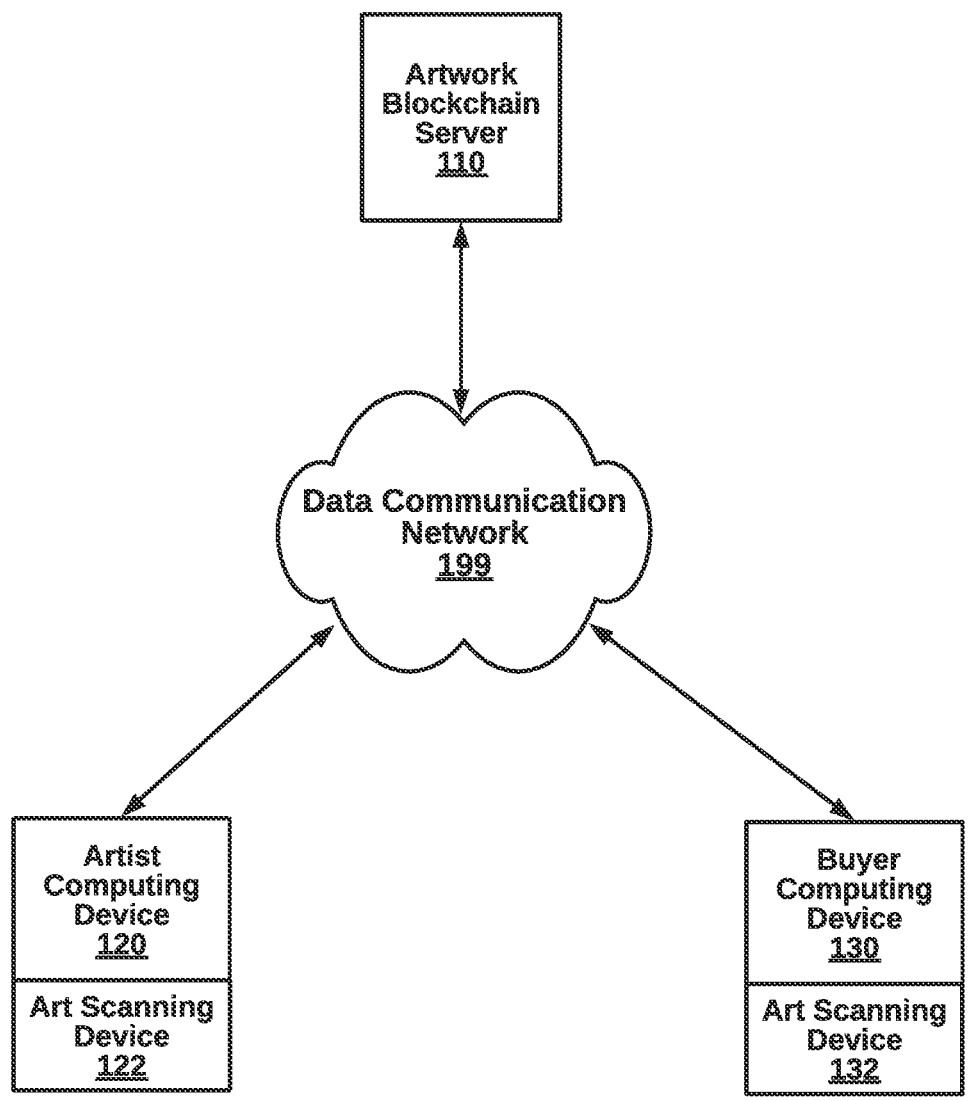
FIG. 1 is a block diagram illustrating a network environment in which a system for authenticating physical artwork can operate, according to some implementations.

FIG. 1 is a block diagram illustrating a network environment in which a system 100 for authenticating physical artwork can operate, according to some implementations. The system 100 includes a blockchain server 110, an artist computing device 120 and a buyer computing device 130 communicatively coupled to a data communication network 199. The system 100 can have many variations, such as a single device for artist and buyer and distributed server components, and additional components, such as gateways, routers and switches. The components can be implemented in hardware, software, or a combination of these, such as the example shown below in FIG. 5.

The blockchain server 110 provides blockchain verification to authentication of artwork using fingerprint matching. An original physical artwork at an initial time is subsequently compared against a test physical artwork, alleged to be the same as the original physical artwork. For example, at the time of purchase and shipment, a buyer can confirm that the received item is indeed the original. Other parts of the commerce chain can also be verified, such as a second or third subsequent sale of the physical artwork can be verified as being of the original. The blockchain server 110 is described further below in association with FIG. 2.

The artist computing device 120 and the buyer computing devices 130 may use APIs or other forms of inter-program communication to send, receive and/or exchange artwork fingerprints and/or other data with the blockchain server 110. A user of the computing devices 120,130 can interact with the blockchain server 110 to engage in blockchain activity as discussed in greater detail below. The authentication process can be initiated and/or performed by just the first and/or just the second entity at a single device (e.g., at a point of sale), or jointly by the first and second entities providing input from their respective devices (e.g., from different network locations). The actual steps of the verification process may be executed at the blockchain server 110 and/or either or both of the artist and buyer computing devices 120, 130. In one implementation, an artwork verification app on either or both of the artist and buyer computing device(s) 120, 130 communicates with the blockchain server 110. In other implementations, a web browser or other software does so. In still another implementation, the artist and buyer computing devices 120, 130 can be the same physical device, and also, the blockchain server 110 can also be either the artist computing device 120 and/or the buyer computing device 130. In different implementations, the execution steps of the verification process may be distributed between multiple computing devices as desired.

Scanners 122, 132 can comprise an integrated digital camera, a physically separated optical scanner device connected to a host, or any appropriate device for digitally capturing physical artwork. A full scanning studio with lighting optimizations and high end equipment can be used in some implementations, and a basic digital camera can be used in other implementations. Several different techniques can be used to capture physical artwork, such as photography, LIDAR (Light Detection and Ranging), and others, as described in more detail below. In some implementations, scan instructions can control what type of scan is performed when more than one type is available. Further, scan instructions can control how the scan type is performed. For example, less than the entire artwork can be captured while focusing on particular locations making up a subset of the physical artwork. In some implementations, different scan methodologies (e.g., LIDAR, different frequencies of electromagnetic radiation, photograph, etc.) and/or different lighting conditions (e.g., quantification of luminosity on the surface at time of scan) may be used to scan different subsections of the artwork. In another example, during post processing, a full scan can be paired down to limited information. In yet another example, the scan results are hashed for further data reduction.

The data communication network 199 can be composed of any data communication network such as the Internet, an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use, e.g., IPv4 or IPv6 address spaces. Various distributed components act in coordination for blockchain transactions.

It is to be understood that a blockchain, or a blockchain used for artwork authentication, is a growing list of data records, known as blocks, which are linked together using cryptography. Each block contains a cryptographic hash of the previous block, and may contain a timestamp and transaction data. For example, scan instructions, scan data, artist signatures, ownership information, and smart contract data can be included. The timestamp proves that the transaction data existed when the block was added to the blockchain. As blocks in the chain each contain a cryptographic hash of the previous block, a blockchain is resistant to modification, because no block can be modified after it is added to the chain without altering all subsequent blocks. The nature of this cryptographic linking of the blocks provides a high level of security, especially if there are a large number of blocks.

A blockchain is distributed across a peer-to-peer network. Blockchains are managed by their corresponding peer-to-peer network, where nodes on the network collectively adhere to a given protocol to communicate and validate new blocks. A consensus algorithm is used that allows the participating nodes to agree on information included within each new block. Using the consensus algorithm, the blockchain is replicated and maintains the same state across the network of participants, allowing the blockchain to function as a secure, decentralized, append-only ledger. Examples of consensus algorithms that can be used in this capacity include proof-of-work, proof-of-stake, proof-of-activity, proof-of-burn, proof-of-capacity, or proof-of-elapsed time. Different blockchains utilize different formats, protocols, networks, etc. Some examples of blockchains include, Bitcoin, Ethereum, FLOW, Tezos, etc.

A blockchain can be used as a ledger for transactions using a specific corresponding digital currency (e.g., purchasing artwork with crypto currency), with the blocks documenting one or more transactions that involve the transfer of the corresponding currency from one party to another. In some implementations, the currency is created as a reward for a process called mining, which is successful use of the consensus protocol to solve a computational problem and thereby validate a new block that is added to the chain. This is known as a proof of work consensus protocol. In other implementations, different proof of consensus protocols are used, such as proof of stake in which nodes compete to append blocks and earn associated rewards in proportion to stake, or existing cryptocurrency allocated and locked or staked for some time period. Other consensus protocols include proof of authority, proof of space, proof of burn, or proof of elapsed time.

Digital currency is registered to a specific address (typically derived from a public key). Once created and awarded to a miner (or other party as appropriate in implementations using different consensus protocols), the currency can be transferred to another party, using the public key of the receiving party as an address and the private key of the transferring party to sign the transaction. Owners of units of digital currency can subsequently use it in further transactions. Each transaction is broadcast to the peer-to-peer network, and once validated it is added to a new block in the chain, created through the process of mining (or other method) using the consensus protocol. To prevent double spending, each transfer must refer to a previous unspent receipt of the currency in the blockchain.

One type of blockchain transaction is the purchase of a non-fungible token (NFT) using cryptocurrency. An NFT is a unit of data stored on a blockchain that certifies the unit of data to be unique and, therefore, not interchangeable. An NFT can be associated with a particular digital or physical asset (such as a file, physical artwork or another physical object), and a license to use the asset for a specified purpose. An NFT does not contain the underlying digital asset itself, but rather contains data that ties it to the asset. This data may be called the metadata. An example of metadata for an NFT would be a URL of the digital image to which the NFT grants rights, or an electronic tag associated with physical artwork. NFTs can be traded and sold on digital markets as blockchain transactions. Being a unit of data on a blockchain, an NFT may be sold and traded.

Unlike cryptocurrencies, NFTs are not mutually interchangeable, hence are not fungible. While all bitcoins or ETH are equal, each NFT is unique, represents a different underlying asset, and thus may have a completely different value from other NFTs. When an NFT is created and added to a blockchain record, the process may be referred to as minting the NFT.

A smart contract may be in the form of a computer program or transaction protocol which may automatically execute, control or document legally relevant events and actions according to the terms of a contract or an agreement. A smart contract (the "mint") may be created and placed on the blockchain. This contract may define the token type, structure, and in some cases code and data, and individuals can use the smart contract's functions to purchase the NFT (or multiple NFTs) defined by the contract, to transact them with other parties, and so forth. For instance, a smart contract can provide executables for the authentication and ownership transfer processes described herein. Different blockchains use different standards and formats for representing NFTs and smart contracts. For example, a smart contract may be in the form of a program which is stored on and executed by the blockchain. The NFT smart contract may define the token type, structure, and data/metadata of the NFT collection. The smart contract may be deployed to (stored on) the blockchain, and then users interact with the smart contract over the blockchain to use a mint function contained by the contract to create a new instance of an NFT in the collection defined by the contract. This mint function may be restricted so that only the creator of the smart contract can invoke it (thus creating a new NFT in the collection), or it may be unrestricted in which case any party may invoke this function.

Figure 2:
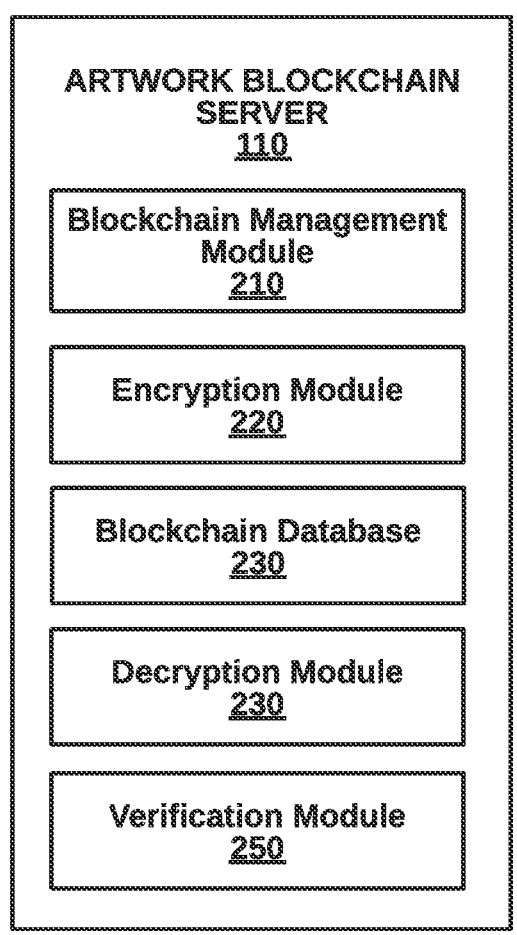
FIG. 2 is a block diagram illustrating the blockchain server of FIG. 1 in more detail, according to one implementation.

FIG. 2 is a block diagram illustrating the blockchain server 110 of FIG. 1 in more detail, according to one implementation. The blockchain server 110 includes a blockchain management module 210, an encryption module 220, a blockchain database 230, a decryption module 240 and a verification module 250. In other implementations, some or most described server-based tasks are performed at a local device or are otherwise distributed between different computing devices as desired.

The blockchain management module 210 can receive an artwork fingerprint derived from a partial or a full scan of an artist's physical artwork and scan instructions for recreating the scan. The fingerprint may be signed with an artist signature associated with the artist's physical artwork. The blockchain encryption module 220 may encrypt fingerprints and/or other information to be placed on the blockchain. This fingerprint and in some cases additional information is/are placed on the blockchain, in some cases in association with an NFT and/or a smart contract. Public and private keys associated with parties to the transaction (e.g., the artist, the first entity, the second entity, etc.) can be stored in the parties' respective wallets, either in the blockchain database 230 or online (or offline) local wallets controlled by the respective parties. The blockchain database 230 can also store other data supporting blockchain authentications, such as system user account information, artwork collection information, etc. In one case, a user logs on and sets-up scan instructions, smart contracts, and other variables through a user interface.

At a subsequent time, a buyer attempts to verify an alleged, original physical artwork as being the authentic original physical artwork, as part of a sale that transfers ownership. Alternatively, an owner or artist may also authenticate physical artwork for other purposes outside of a pending transaction. To do so, the verification module 250 subsequently receives a test fingerprint comprising at least a partial scan of the alleged, original physical artwork. The decryption module 240 recovers and decrypts the known fingerprint on the blockchain, for comparison against the test fingerprint. Additionally, an artist's signature can be used to sign the known fingerprint, to verify that the known fingerprint itself has not been compromised. In different flows described below, public and private keys of the parties to the transaction(s) may be provided for decryption processes (e.g., as described by a smart contract). In some cases, a point of sale transaction is in process, and hinges upon successful verification results being returned.

If comparison by the verification module 250 confirms that the alleged, original physical artwork is indeed the same as the original physical artwork, the blockchain management module 210 transfers control of authentication from the artist to the buyer. Specifically, the artist fingerprint is transferred from the seller to the buyer on the blockchain, and can be updated and re-encrypted for a subsequent verification. In other words, the trusted artist fingerprint (and in some implementations an associated NFT and/or smart contract) are associated with the address of the buyer, and the blockchain is updated accordingly.

It is to be understood that the components and modules of the system 100 can be instantiated (for example as object code or executable images) within the system memory 510 (e.g., RAM, ROM, flash memory) of any computer system 500, such that when the processor 520 of the computer system 500 processes a module, the computer system 500 executes the associated functionality. As used herein, the terms "computer system," "computer," "backend computer system," "endpoint computer system," "client," "client computer," "server," "server computer" and "computing device" mean one or more computers configured and/or programmed to execute the described functionality. Additionally, program code to implement the functionalities of system 100 can be stored on computer-readable storage media. Any form of tangible computer-readable storage medium can be used in this context, such as magnetic, optical, flash and/or solid-state storage media, or any other type of media. As used herein, the term "computer-readable storage medium" does not mean an electrical signal separate from an underlying physical medium.

II. Methods for Blockchain Artwork Authentication

Figure 3A:
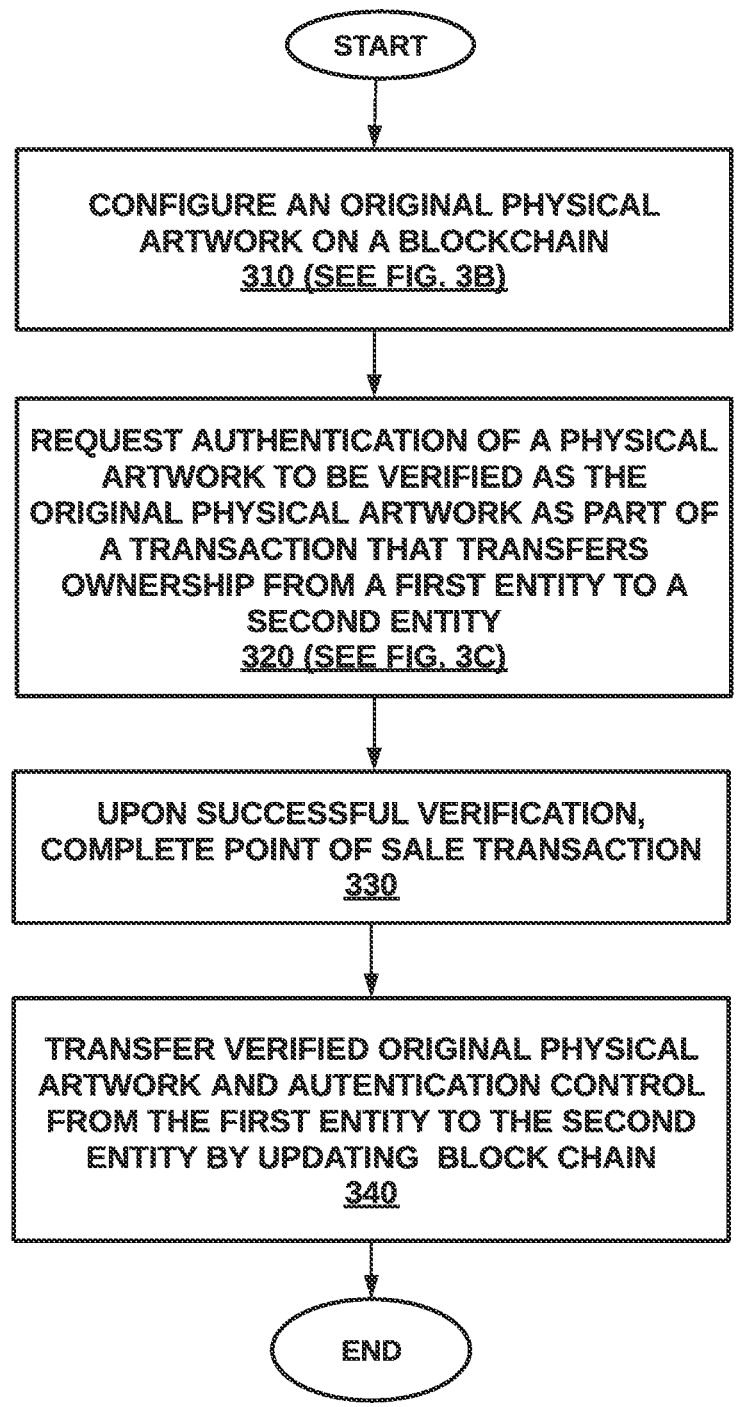
FIGS. 3A-3C are flow charts illustrating a method for blockchain artwork authentication, according to one implementation.

FIG. 3A is a high-level flow chart illustrating a method 300 for blockchain artwork authentication, according to implementation. The listed steps are merely example groupings of functionality that can be performed in different orders. Many other variations are possible, as shown by the specific implementation examples that follow. In one implementation, the system 100 performs the steps of the method 300.

An original physical artwork is configured on a blockchain (step 310), as described in more detail with respect to FIG. 3B below. Authentication of a physical artwork to be verified as the original physical artwork can be requested (step 320), as detailed in association with FIG. 3C below. In some cases, authentication can be part of a point of sale transaction, which can involve payment via crypto currency (or otherwise). Digital sales transactions can optionally be handled by contingent to verification. In other cases, no transaction is pending with respect to authentication requests. Upon successful verification, a point of sale transaction can be completed (step 330). Then ownership for the verified original physical artwork can be transferred in the physical world, while also transferring control of future authentications by updating the blockchain with a new block pertaining to the transfer (step 340). The contents of the new block can include encryptions using keys of the second entity (e.g., the buyer). In another implementation, transfers can occur without any corresponding financial transaction.

Figure 3B:
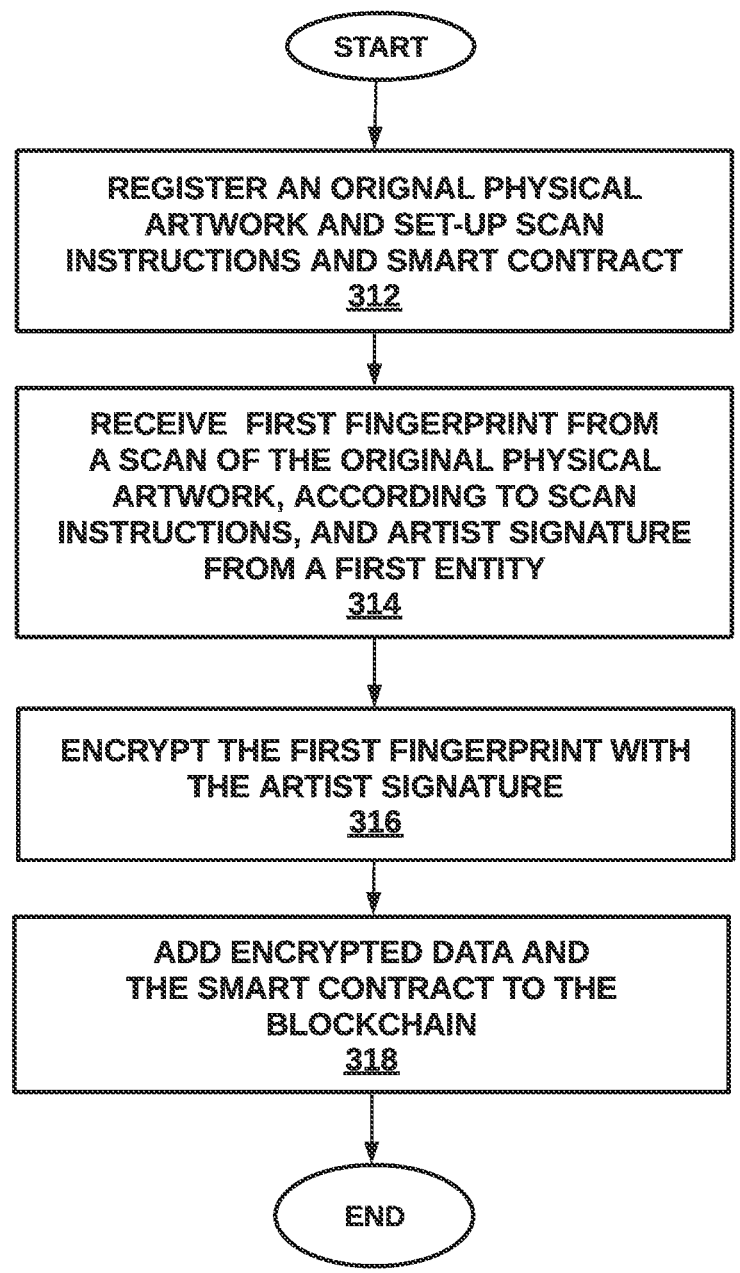

Turning to FIG. 3B, an original physical artwork is registered along with a specification of scan instructions and a smart contract (step 312). A first fingerprint is received from a first entity (step 314). The first fingerprint may comprise a scan of the original physical artwork made according to the scan instructions, such as from at least a partial LIDAR scan of an artist physical artwork, and perhaps hashed, as described below through several examples. The first fingerprint can further include the scan instructions and optionally additional information concerning the scan. Additionally, the first fingerprint can be signed and/or optionally encrypted using a key of the artist or other party associated with the original physical artwork, such as the artist's representative or brokerage house (step 316). This data concerning the original physical artwork is assigned to the first entity on the blockchain, by associat5ing the data with the address (e.g., public key) of the first entity. Optionally an NFT associated with the original physical artwork and/or a smart contract for executing the transaction steps is/are included on the blockchain with the data assigned to the first entity (step 318).

Figure 3C:
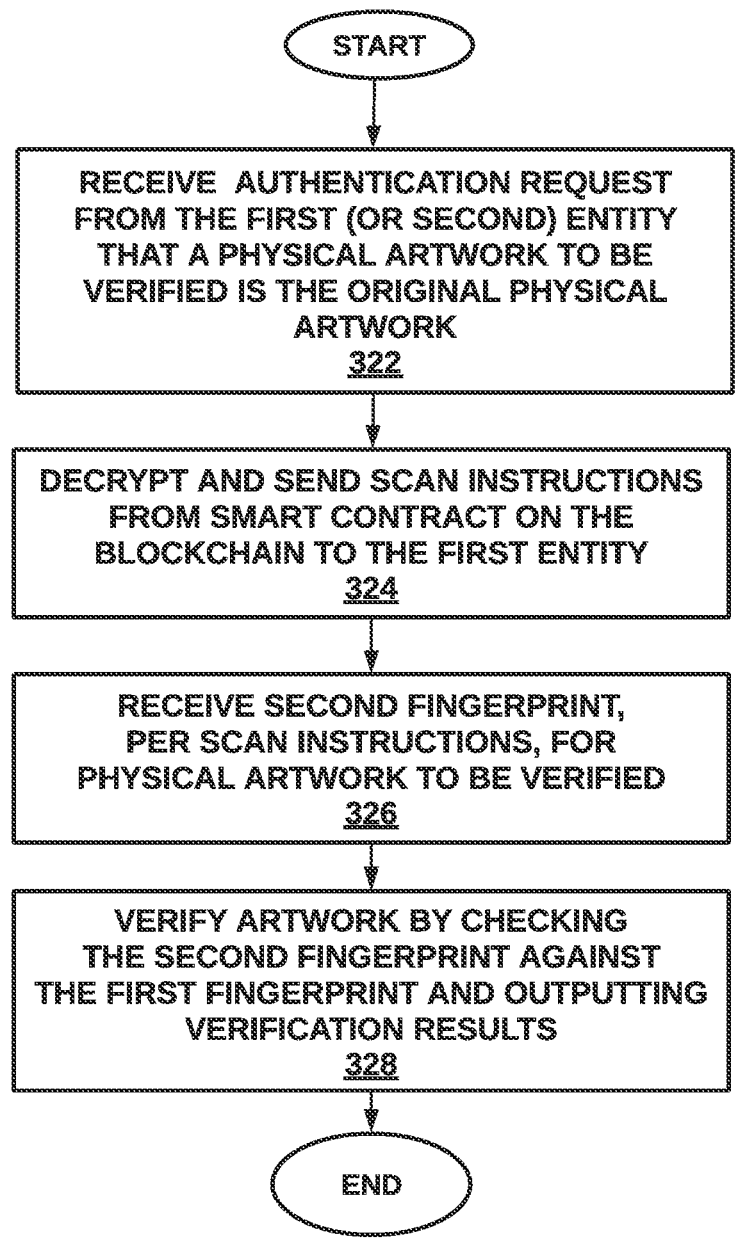

Next, in FIG. 3C, an authentication request is received from a first (or second) entity that a physical artwork to be verified is the original physical artwork (step 322). In response, the scan instructions and the smart contract are retrieved from the blockchain and, where encrypted, decrypted (step 324). A second fingerprint comprising at least a partial scan of a physical artwork to be verified, created according to the scan instructions, is received (step 326). This allows the second fingerprint to be verified as authentic by attempted matching against the first fingerprint (step 328). Successful or unsuccessful verification results can be sent or otherwise output to the first entity and/or the second entity.

Various ones of the above described steps may be executed automatically by the smart contract.

The steps of method 300 are now described in more detail with different examples set forth below as flows:

A. Creating Digital Scans of Artworks

As described in more detail below, examples of scan instructions include locations or sections of a physical artwork to be scanned, the type of scan to be performed, the topography of a scanned area, etc.

The scan itself (e.g., the digital image created by scanning at least a portion of the physical artwork according to the scan instructions) and the information concerning the scan (e.g., the scan instructions) are herein referred to as a fingerprint of the artwork, or an artwork fingerprint. It is to be understood that the scan and information concerning the scan may be stored separately or in a single file as desired. In addition, the scan and/or the information concerning the scan may be encrypted and/or signed, either separately or together.

Figure 4:
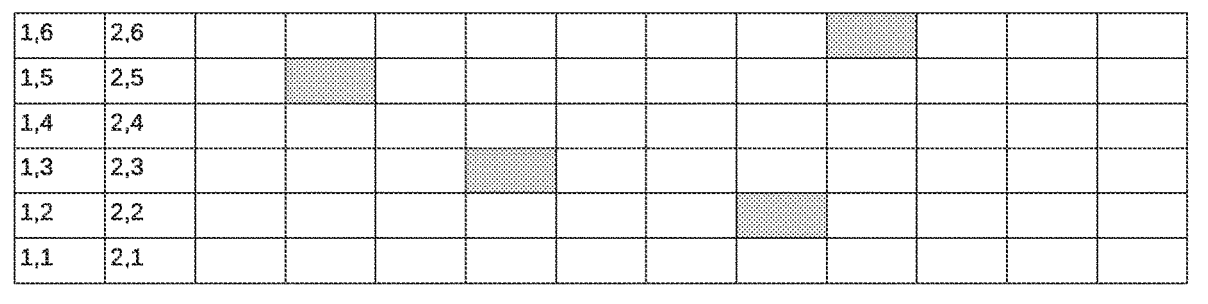

In different implementations, different sections of the artwork may be scanned. For example, FIG. 4 is a table illustrating a scan grid for a surface of the artwork.

A subset of the boxes of the grid can then be scanned. It is to be understood that the size of the grid (e.g., the number of columns and rows of the grid) is a variable design parameter. In the example grid show above, the leftmost column is labeled column 1 with the column numbers incrementing along the x axis, and the bottom row is labeled row 1 with the row numbers incrementing along the y axis. The boxes of the grid can be labeled as (column, row) as shown above in the first two columns and rows of the example grid. Of course, this labeling is just an example of a convention, and other labeling schemes can be used in other implementations as desired. In addition, in other implementations, the artwork can also be divided into sections using structures other than a grid, so long as certain specific subareas of the artwork are identified, for example by a set of vector coordinates from a point of references or the like.

A subset of the sections of the artwork can be scanned. For example, in the example grid shown above the shaded sections can be scanned, resulting in the set of sections {(4,5), (6,3), (9,2), (10,6)} beings scanned. It is also to be understood that how many areas of an artwork to scan, as well as which specific areas of the artwork to scan, can vary between implementations at any level of granularity as desired. The areas scanned need not all be of the same shape and/or size. For example, areas of any geometric shape (e.g., rectangle, square, triangle, circle, oval, trapezoid, etc.) may be scanned, including areas of multiple shapes and/or sizes. As noted above, the location information can be stored in any viable format that identifies the scanned areas, such as sets of raster or vector coordinates, etc. In any case, information identifying which sections of the artwork were scanned may be included in the fingerprint, e.g., as identified by locations on a grid or another form of location identification.

The fingerprint can also be associated with (or include) the method(s) used for scanning the different sections. For example, different frequencies of electromagnetic radiation can be used to scan one or more sections of the artwork, such as x-ray, ultraviolet, infrared, visible light, etc. Which scan technique to use for which scanned section can vary between implementations as desired. In some implementations, the scan methods can be represented by numbers or other symbolic indicators (e.g., x-ray=1, ultraviolet=2, infrared red=3, visible light=4, etc.). Thus, where the shaded sections above were scanned using x-ray, infrared, visible light and ultraviolet respectively, the information concerning the sections scanned and the scanning methods could be represented as {(4,5,1), (6,3,3), (9,2,4), (10,6,2)}. As noted above, the exact format of the information identifying the scanned location(s) and scanning method(s) is a variable design parameter.

In some implementations, LIDAR is used to determine the topography of the surface of the artwork, and that information is used as part of the fingerprint. LIDAR is a method for determining variable distances by targeting an object or a surface with a light from a pulsed laser, and measuring the time for the reflected light to return to the LIDAR apparatus (which includes both the laser and a light detector). LIDAR can thus be used to make three dimensional digital representations of the surface. LIDAR can determine the range of distances to a surface using the formula $d=ct/2$, where d is the distance between the LIDAR apparatus and the surface, c is the speed of light, and t is the time for the light emitted by the laser to travel to and from the surface. By using LIDAR, the ranges of distances between the apparatus and a non-uniform surface can be determined. In the case of an artwork, the height of the paint on the canvas is not uniform, but varies as a function on the brushstrokes and other factors concerning the application. Other types of artworks also have three-dimensional variance. This information can be measured using LIDAR, and the resulting identification of the topography of all or specific sections of the artwork can be included in the fingerprint used to authenticate the artwork.

In some implementations, wavelet decomposition is used, in which the digital image of the artwork is broken down into a series of sub-bands. Wavelet decomposition is a signal processing technique that performs image decomposition based on scale and orientation. Low-pass and high-pass filters that satisfy certain specific constraints are applied. A frequency may be assigned to each sub-band to determine the textures in the image. For example, broad strokes would have a low frequency, while fine strokes would have a high frequency. The determined information concerning the digital image of the artwork may be included in the fingerprint, and used in the authentication of the artwork.

In some implementations, artificial intelligence (AI) techniques are applied to the result of the scan to recognize specific features in the digital image of the artwork. For example, AI can be used to identify images of faces, animals, trees, fruit, etc. Information concerning recognized objects in the image may be specified in scan instructions to be included in the fingerprint, and used in the authentication of the artwork. This information can be at any level of granularity, such as numbers and types of objects identified, distances between them, position of identified objects in the image, etc.

The fingerprint alone or in combination with scan instructions includes the information needed to repeat the scan, in order to verify the authenticity of the artwork. This information can include the conditions under which the scan was executed at any desired level of granularity, such as, for example, the spectrum of the illuminating source used, the average reflectivity, the average luminance and/or chrominance over a given scan area, reflected intensity of given wavelengths averaged over a given area, and/or any other information about the conditions under which the scan was executed, the exact equipment used, properties of the equipment, etc.

To avoid false negatives when the artwork is authenticated, the artwork may be scanned multiple times, under a variety of conditions, and acceptable probability ranges may be determined for specific measurements. It is to be understood that the specific probability error ranges to use are variable design parameters, as are the methodologies used in this context to determine authenticity. Statistical modeling may be used and/or Bayesian analysis. Acceptable margins of error of different factors can vary as desired. Machine learning can be used in this context, to train and improve the accuracy of the model(s) on both known actual matching artworks and non-matching ones, before deployment in production.

In any case, the fingerprint contains the results of the scan, and additional information concerning the scan as described above, such that the scan can be repeated, and a determination can be made as to whether the artwork being rescanned is the same one that was scanned originally. As discussed above, the specific implementation details of the scan, the information stored concerning the scan, and the parameters for determining whether a subsequent scan matches within an acceptable range of probability are variable design parameters, as is the format(s) in which to store and/or represent this information.

The fingerprint may be included in or with a smart contract on the blockchain, and used in the authentication process as described below.

B. Tracking and Authenticating Image Fingerprints on a Blockchain

The following are three examples of flows for authenticating art using smart contracts. In some implementations, other flows may be used as desired. The described flows are agnostic to how the fingerprint of the artwork is produced. Any fingerprint of an artwork which uniquely identifies and authenticates the work may be used in these flows. Some methods of producing such fingerprints in some implementations are described above.

Cryptographic Notation Used Herein:
    Kpub,Alice—Alice's public key
    Kpriv,Alice—Alice's private key
    {X}Kpub,Alice—Message X encrypted with Alice's public key
    [X]Kpriv,Alice—Message X signed with Alice's private key
    a—the work of art
    F—the fingerprint function
    F(a)—the fingerprint of the work of art
    H—some hash function
    H(m)—the hash of some message m Since the flows described herein are agnostic to the technical details of the fingerprinting implementation, a few assumptions are made here for the purpose of describing the flows: it is assumed that for some artwork some fingerprinting method F that produces the fingerprint F(a); it is assumed that the fingerprinting method F operates similarly to a cryptographic hash function in that from a variable-length input data set, it produces a fixed-length "digest", the "fingerprint" F(a); and it is assumed that F is sensitive and precise enough such that given some artwork a and a forgery a' of it, that F(a)≠F(a'), that is, the fingerprints will not match.

For the purposes of the description of the examples flows, it is assumed that the blockchain functionalities, smart contract capabilities, and cryptographic primitives are those of the Ethereum blockchain or of another EVM-compatible chain. It is to be understood that the described flows are not limited to being implemented in conjunction with those technologies. It is possible for these flows to be implemented with other blockchains and/or tech stacks as desired. Blockchains and their associated functionality are described in detail above and below.

Additionally, the exact manner of the storage of the fingerprint on the blockchain is not described in the flows, although several approaches are suggested below. Due to the interchangeable nature of the various approaches, it is to be understood that the approaches described below are just examples.

Example Flow #1—Authenticating an Encrypted Fingerprint

Assumptions: It is assumed in the context of Flow #1 that it is desirable to protect the confidentiality of F(a) by encrypting it rather than signing it.

Flow:
    Artist creates piece of art a
    Artist (or clearinghouse) generates fingerprint F(a), and creates a signature of the fingerprint [F(a)]Kpriv,artist
    The initial owner of the piece of art (whether the artist, clearinghouse, or customer) encrypts the fingerprint and artist's signature of the fingerprint with their public key: {F(a)|[F(a)]Kpriv,artist}Kpub,owner; let this be called E
    The owner uploads E to the blockchain or smart contract on the blockchain
    When a purchaser wishes to purchase the piece of art, they can independently derive F(a)'

The current owner can decrypt E by applying a private key operation to it, resulting in the unencrypted F(a)|[F(a)]Kpriv,artist.

The purchaser can verify that their calculated fingerprint matches the decrypted version of the encrypted fingerprint which was stored on-chain, i.e., that F(a)=F(a)'

The purchaser can use Kpub,artist to verify the signature of the fingerprint [F(a)]Kpriv,artist Having performed this authentication, the purchaser can purchase the art either on-chain (e.g., as a Non-Fungible Token (NFT)), or may purchase it off-chain The owner transfers control of the encrypted fingerprint to the purchaser, and the purchaser calculates {F(a)|[F(a)]Kpriv,artist}Kpub,purchaser, called E'

The purchaser updates the encrypted fingerprint on the blockchain with E'

Some Pros of Flow #1:

The confidentiality of the true fingerprint F(a) is protected to prevent a malicious third party from attempting to reverse-engineer the fingerprint to be able to create a forgery good enough to match the true fingerprint.

The integrity of the fingerprint is provided by the artist's signature of the fingerprint—if the purchaser uploads some alternative fingerprint F(a'), a subsequent purchaser will find that it does not match the artist's signature.

The authenticity of the fingerprint is provided—since the signature can be verified using the artist's public key, the purchaser can verify that the artist did in fact sign it with their private key.

Note that in this flow the current owner discloses F(a) in unencrypted form to the purchaser. Since all else being equal it is desirable to preserve confidentiality of F(a), this could be considered to be a cost of this flow.

Example Flow #2—Authenticating an Encrypted Fingerprint with ZK Proofs

Assumptions: It is assumed in the context of Flow #2 that it is desirable to protect the confidentiality of F(a) by encrypting it rather than signing it.

Flow:

Artist creates piece of art a

Artist (or clearinghouse) generates fingerprint F(a), and creates a signature of the fingerprint [F(a)]Kpriv,artist The initial owner of the piece of art (whether the artist, clearinghouse, or customer) encrypts the fingerprint and artist's signature of the fingerprint with their public key: {F(a)|[F(a)]Kpriv,artist}Kpub,owner; let this be called E The owner uploads E to the blockchain or smart contract on the blockchain When a purchaser wishes to purchase the piece of art, they can independently derive F(a)'

The current owner calculates H(E|F(a)).

The current owner knows F(a) since they can decrypt it with a private key operation on E produced in Step 3.

The purchaser can read E from the blockchain, and computes H(E|F(a)')

The purchaser compares H(E|F(a)) to what they calculated, i.e., H(E|F(a)')

If the two match, the purchaser has authenticated the fingerprint.

If the two do not match, the purchaser has failed to authenticate the artwork, and the confidentiality of F(a) is preserved The owner can then provide the artist's signature [F(a)]Kpriv,artist to the purchaser, who can authenticate the signature with the fingerprint F(a) and the artist's Kpub Having performed this authentication, the purchaser can purchase the art either on-chain (e.g., as an NFT), or may purchase it off-chain The owner transfers control of the encrypted fingerprint to the purchaser, and the purchaser calculates {F(a)'}Kpub,purchaser, called E'

The purchaser updates the encrypted fingerprint on the blockchain with E'

Some Pros of Flow #2:

The confidentiality of the true fingerprint is protected to prevent a malicious third party from attempting to reverse-engineer the fingerprint to be able to create a forgery good enough to match the true fingerprint.

The integrity of the fingerprint is provided by the artist's signature of the fingerprint—if the purchaser uploads some alternative fingerprint F(a'), a subsequent purchaser will find that it does not match the artist's signature.

The authenticity of the fingerprint is provided—since the signature can be verified using the artist's public key, the purchaser can verify that the artist did in fact sign it with their private key.

The confidentiality of the fingerprint is protected until the purchaser has proved they already know it.

Example Flow #3—Authenticating a Cryptographically Signed Fingerprint

Assumptions: It is assumed in the context of Flow #3 that F(a) need not be confidential because F has pre-image resistance, second pre-image resistance, and collision resistance Flow:

Artist creates piece of art a

Artist (or clearinghouse) generates fingerprint F(a), and creates a signature of the fingerprint [F(a)]Kpriv,artist The artist or clearinghouse uploads F(a) and [F(a)]Kpriv,artist to the blockchain A potential purchaser can authenticate the artwork by computing F(a)' and verifying that it matches F(a)

The potential purchaser can then authenticate the artist's signature of the fingerprint [F(a)]Kpriv,artist with the artist's public key [F(a)]Kpub,artist Having performed this authentication, the purchaser can purchase the art either on-chain (e.g., as an NFT), or may purchase it off-chain Some Pros of Flow #3:

The integrity of the fingerprint is protected by virtue of the original fingerprint being preserved on the blockchain.

The authenticity of the fingerprint is provided by the artist's signature of it.

C. Blockchain Storage Approaches

There are several possible approaches for creating, reading, and updating the fingerprint stored on the blockchain.

Ethereum Smart Contracts—A smart contract is created for a single artwork a or for n works of art. The encrypted or signed signature can be stored either in the smart contract's storage, or can be logged as an event from the smart contract. For Flows 1 and 2, where the data on the blockchain is updated, either the internal storage of the smart contract can be updated, or the contract can emit an event with the most up-to-date version of the encrypted fingerprint. For Flow 3, the signature could be an NFT that the owner of the artwork would hold. Using an NFT-like scheme, or by emitting events or storing the current owner's address, the smart contract can be used to track the owner of the artwork.

Purpose-built Blockchain—In some implementations, an application-specific blockchain is defined, whose ledger tracks the most up-to-date encrypted version of the encrypted fingerprint (Example Flows 1 and 2), and that could provide primitives for transferring ownership of works of art identified by either the encrypted fingerprint (1 and 2) or the signed fingerprint (3). In different implementations the fingerprint may be stored on the blockchain and/or on an RFID tag physically coupled to the artwork itself (e.g., embedded in the frame or similar).

D. Additions to the Schemes Described Above

The following additions or modifications may be made to any of the above schemes without any modification to the fundamental flow of the scheme.

Clearinghouse's Signature. In place of the artist's signature of the fingerprint, or in addition to it, the clearinghouse's signature could also be included:

With the clearinghouse's signature only, let E {F(a)|[F(a) Kpriv,clearinghouse}Kpub,owner.

With both the artist's signature and the clearinghouse's signature, let E={F(a)|[F(a)]Kpriv,artist|[F(a)]Kpriv, clearinghouse}Kpub,owner.

III. Computer Devices for Blockchain Artwork Authentication

Figure 5:
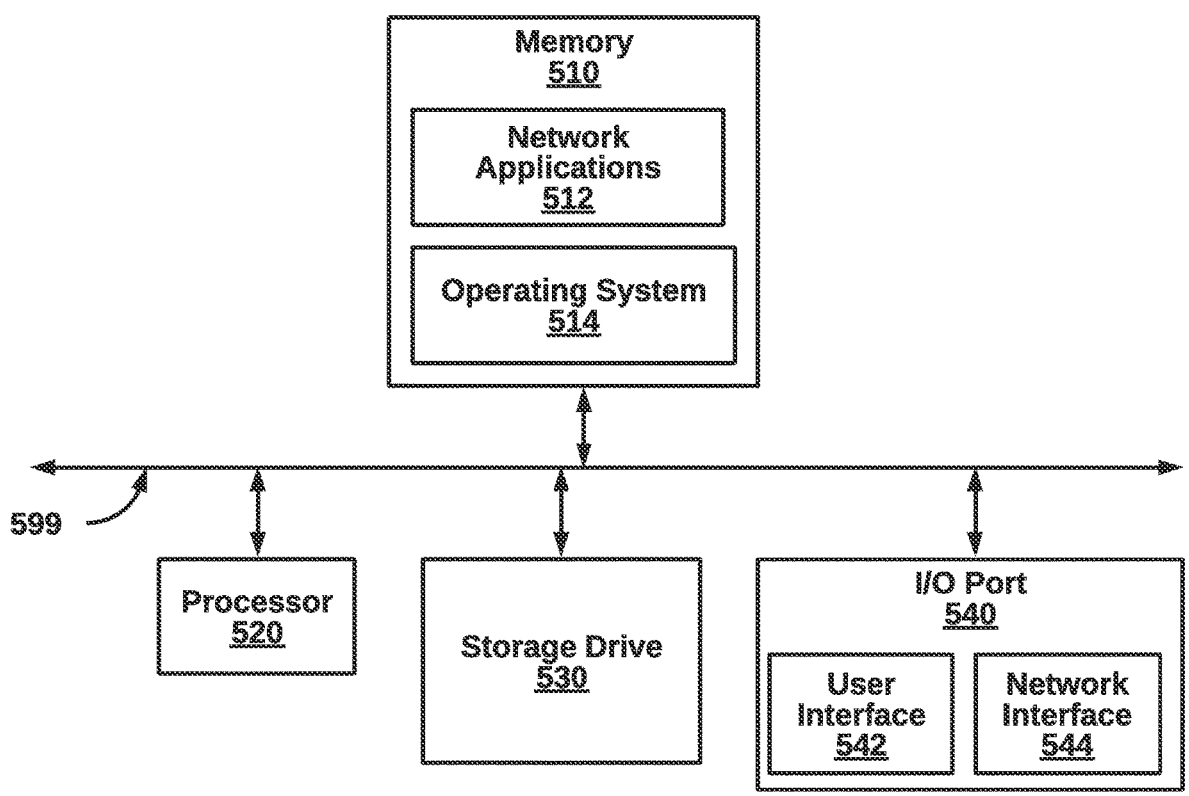
FIG. 5 illustrates a computer system suitable for implementing devices of a the blockchain artwork authentication system of FIG. 1, according to some implementations.

FIG. 5 is a block diagram of an example computer device 500 suitable for implementing components of blockchain artwork authentication in the system 100 of FIG. 1, according to one implementation. For example, the artwork blockchain server 110, the artist computing device 120 and the buyer computing device 130 can be embodied in the computing device 500 as a desktop computer, a laptop computer, a tablet computer, a mobile telephone, a server blade, and the like. As illustrated, the computer device 500 includes a memory 510, a processor 520, a storage drive 530 and an I/O port 540, each communicatively coupled by a bus 599.

The memory 510 further comprises network access applications 512 and an operating system 514. Network access applications 512 can include a web browser, a mobile access application, an access application that uses networking, a remote access application executing locally, a network protocol access application, a network management access application, a network routing access application, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multicore, or include more than one processing element. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In one implementation, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for the purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A computer implemented method for automatically authenticating physical artwork by a computer system with scans using blockchain security over a data communication network, the method comprising the steps of:
  receiving a request to authenticate a physical artwork to be verified as being an original physical artwork owned by a first entity, the original physical artwork being associated with an entry on a blockchain that is currently associated with the first entity and comprises a smart contract, a first scan of the physical artwork created by scanning the physical artwork according to scan instructions, and the scan instructions used to create the first scan, wherein the scan instructions specify at least one frequency of electromagnetic radiation used to create the first scan, and coordinates representing at least one limited subset of the original physical artwork used to create the first scan;
  retrieving the first scan of the physical artwork created by scanning the physical artwork according to scan instructions, and the scan instructions used to create the first scan from the blockchain, the first scan and the scan instructions being encrypted and stored together as a single entity;
  automatically executing the smart contract retrieved from the blockchain to automatically decrypt the encrypted first scan of the physical artwork created by scanning the physical artwork according to the scan instructions, and the scan instructions used to create the first scan;
  receiving the second scan, the second scan being created by scanning a physical artwork to be verified according to the scan instructions, using the at least one frequency of electromagnetic radiation specified by the scan instructions, and scanning at least one limited subset of the physical artwork to be verified as indicated by the coordinates specified by the scan instructions;
  wherein the at least one limited subset of the physical artwork to be verified in the second scan corresponds to the at least one limited subset of the original physical artwork included in the first scan;
  verifying whether the first scan matches the second scan, to determine whether the physical artwork to be verified is the original physical artwork;
  outputting verification results; and
  responsive to a successful verification that the first scan matches the second scan and to receiving a control signal from the first entity indicating to proceed, transferring authentication of ownership of the original physical artwork from the first entity to a second entity on the blockchain.

2. The method of claim 1, wherein:
  the first scan and the scan instructions being encrypted and stored together as a single entity retrieved from the blockchain further comprises the first scan and the scan instructions being encrypted and stored together as a single entity being signed with a private key associated with an artist of the original physical artwork;
  verifying whether the first scan matches the second scan further comprises, decrypting the first scan and the scan instructions being encrypted and stored together as a single entity using a public key associated with the artist, to determine whether the first scan and the scan instructions being encrypted and stored together as a single entity is legitimately signed by the artist; and
  outputting verification results further comprises outputting results of verification of the artist's signature of the first scan and the scan instructions being encrypted and stored together as a single entity.

3. The method of claim 2, wherein the artist is distinct from the first entity.

4. The method of claim 2, wherein the artist is not distinct from the first entity.

5. The method of claim 1, wherein transferring authentication of ownership comprises adding a block to the blockchain.

6. The method of claim 1, wherein transferring authentication of ownership comprises encrypting the first scan and the scan instructions signed with the artist signature with a private key associated with the second entity.

7. The method of claim 1, further comprising:
  conducting a transaction between the first entity and the second entity, wherein completion of the transaction provides permission from the first entity for transferring ownership of the original physical artwork.

8. The method of claim 1, further comprising:
  adding a block to the blockchain to establish ownership of the original physical artwork by the first entity, including encrypting the first scan and the scan instructions with the public key of the first entity.

9. The method of claim 1, wherein the computer system comprises a local artwork scanning device and a remote artwork verification server.

10. The method of claim 1, further comprising:
responsive to an unsuccessful verification, precluding transfer of ownership of the original physical artwork.

11. The method of claim 1, further comprising:
notifying the first entity of a verification attempt.

12. The method of claim 1, further comprising:
scanning the original physical artwork and the physical artwork to be verified according to the scan instructions.

13. The method of claim 12, wherein the scan instructions further specify:
to scan physical art works using wavelet decomposition to identify topographical features.

14. The method of claim 13, wherein using wavelet decomposition to identify topographical features further comprises:
assigning a distinct frequency to each of a plurality of sub-bands to determine textures; and
including the wavelet decomposition and distinct frequencies assigned to each of the plurality of sub-bands in the scan instructions.

15. The method of claim 12, wherein the at least one limited subset of the physical artwork represented by the coordinates in the scan instructions further comprises:
multiple, non-contagious sections of the physical artwork.

16. The method of claim 15, wherein the scan instructions further specify to:
scan different specific ones of the multiple, non-contagious sections of the physical artwork using different specific frequencies of electromagnetic radiation.

17. The method of claim 12, wherein the instructions further specify:
to create a hash of each scan created according to the scan instructions.

18. The method of claim 12 further comprising:
using artificial intelligence (AI) to identify specific objects in scans on physical artwork; and
including information concerning recognized objects in the scan instructions;
including information concerning recognized objects in the first scan and the second scan.

19. The method of claim 12, wherein the scan instructions further specify:
to scan the original physical art using light detection and ranging (LIDAR) to identify topographical features.

20. The method of claim 1, wherein the blockchain entry further comprises a non-fungible token (NFT) associated with the original physical artwork.

21. The method of claim 1, further comprising:
receiving a cryptocurrency payment for the original physical artwork, wherein the cryptocurrency payment is contingent upon successful verification of the physical artwork to be verified as the original physical artwork.

22. The method of claim 1, wherein the original physical artwork comprises at least one of a painting and a sculpture.

23. The method of claim 1, wherein the original physical artwork further comprises an electronic identification tag, and the scan instructions require an input from the electronic identification tag of the physical artwork to be verified.

24. At least one non-transitory computer-readable storage medium for automatically authenticating physical artwork with scans using blockchain security over a data communication network, the at least one non-transitory computer-readable storage medium storing computer executable instructions that, when loaded into computer memory and executed by at least one processor of a computing device, cause the computing device to perform the following steps:
receiving a request to authenticate a physical artwork to be verified as being an original physical artwork owned by a first entity, the original physical artwork being associated with an entry on a blockchain that is currently associated with the first entity and comprises a smart contract, a first scan of the physical artwork created by scanning the physical artwork according to scan instructions, and the scan instructions used to create the first scan, wherein the scan instructions specify at least one frequency of electromagnetic radiation used to create the first scan, and coordinates representing at least one limited subset of the original physical artwork used to create the first scan;
retrieving the first scan of the physical artwork created by scanning the physical artwork according to scan instructions, and the scan instructions used to create the first scan from the blockchain, the first scan and the scan instructions being encrypted and stored together as a single entity;
automatically executing the smart contract retrieved from the blockchain to automatically decrypt the encrypted first scan of the physical artwork created by scanning the physical artwork according to the scan instructions, and the scan instructions used to create the first scan;
receiving the second scan, the second scan being created by scanning a physical artwork to be verified according to the scan instructions, using the at least one frequency of electromagnetic radiation specified by the scan instructions, and scanning at least one limited subset of the physical artwork to be verified as indicated by the coordinates specified by the scan instructions;
wherein the at least one limited subset of the physical artwork to be verified in the second scan corresponds to the at least one limited subset of the original physical artwork included in the first scan;
verifying whether the first scan matches the second scan, to determine whether the physical artwork to be verified is the original physical artwork;
outputting verification results; and
responsive to a successful verification that the first scan matches the second scan and to receiving a control signal from the first entity indicating to proceed, transferring authentication of ownership of the original physical artwork from the first entity to a second entity on the blockchain.

25. An artwork blockchain server for automatically authenticating physical artwork with scans using blockchain security over a data communication network, the artwork blockchain server comprising:
a processor;
a network interface, communicatively coupled to the processor and to the data communication network; and
a memory, communicatively coupled to the processor and storing:
a blockchain management module to receive a request to authenticate a physical artwork to be verified as being an original physical artwork owned by a first entity, the original physical artwork being associated with an entry on a blockchain that is currently associated with the first entity and comprises a smart contract, a first scan of the physical artwork created by scanning the physical artwork according to scan instructions, and the scan instructions used to create the first scan, wherein the scan instructions specify at least one frequency of electromagnetic radiation used to create the first scan, and coordinates representing at least one limited subset of the original physical artwork used to create the first scan; wherein the blockchain management module retrieves the first scan of the physical artwork created by scanning the physical artwork according to scan instructions, and the scan instructions used to create the first scan from the blockchain, the first scan and the scan instructions being encrypted and stored together as a single entity a smart contract module to automatically execute the smart contract retrieved from the blockchain to automatically decrypt the encrypted first scan of the physical artwork created by scanning the physical artwork according to the scan instructions, and the scan instructions used to create the first scan; wherein the blockchain management module receives the second scan being created by scanning a physical artwork to be verified according to the scan instructions, using the at least one frequency of electromagnetic radiation specified by the scan instructions, and scanning at least one limited subset of the physical artwork to be verified as indicated by the coordinates specified by the scan instructions; and wherein the at least one limited subset of the physical artwork to be verified in the second scan corresponds to the at least one limited subset of the original physical artwork included in the first scan; and a verification module to verify whether the first scan matches the second scan, to determine whether the physical artwork to be verified is the original physical artwork; wherein the verification module outputs verification results, and wherein the blockchain management module, responsive to a successful verification that the first scan matches the second scan and to receiving a control signal from the first entity indicating to proceed, transferring authentication of ownership of the original physical artwork from the first entity to a second entity on the blockchain.

* * * * *